United States Patent [19]

Horiuchi

[11] 4,354,430
[45] Oct. 19, 1982

[54] BALE TENSION APPARATUS

[75] Inventor: George H. Horiuchi, Kingsburg, Calif.

[73] Assignee: Sperry Corporation, New Holland, Pa.

[21] Appl. No.: 232,345

[22] Filed: Feb. 6, 1981

[51] Int. Cl.³ ............................................. B30B 15/00
[52] U.S. Cl. ..................................................... 100/192
[58] Field of Search .................... 100/43, 191, 192; 92/165, 168, 251; D15/27

[56] References Cited

U.S. PATENT DOCUMENTS

| D. 192,371 | 3/1962 | Kermes | D15/27 |
|---|---|---|---|
| 2,823,603 | 2/1958 | Collins | 100/192 X |
| 3,334,937 | 8/1967 | Jofeh | 92/165 R |
| 3,650,182 | 3/1972 | Phillips | 92/165 R |
| 4,089,253 | 5/1978 | Visser | 92/168 |
| 4,125,071 | 11/1978 | Young | 100/191 |
| 4,211,151 | 7/1980 | Wallischeck | 92/165 R |

OTHER PUBLICATIONS

Sperry New Holland Brochure, "Balers," No. 31042532, Sep. 1979.

*Primary Examiner*—Billy J. Wilhite
*Attorney, Agent, or Firm*—Darrell F. Marquette; Larry W. Miller; Frank A. Seemar

[57] ABSTRACT

A hydraulic cylinder is mounted on a support adjacent a bale forming chamber of an agricultural baler. A piston driven rod extends from the cylinder for moving a tension member associated with the bale chamber. Distortion, created by welds, is avoided because no welds are used to support a rod bearing portion of the cylinder. Instead, fasteners extend through the support and directly into the rod bearing portion of the hydraulic cylinder.

3 Claims, 6 Drawing Figures

BALE TENSION APPARATUS

BACKGROUND OF THE INVENTION

This invention relates generally to harvesters adapted for compressing and binding crop material and more particularly to a tension device used in connection therewith.

Resilient tensioning devices have been used to adjust tensioning rails of a rectangular bale chamber. These devices permit manual adjustment of a threaded member for adjusting tension in associated springs thus controlling the density of bales being formed.

Subsequently, a fluid operated cylinder was used to adjust the tensioning rails. Such cylinders were connected to the bale chamber by being welded adjacent the bale chamber.

As a result, a certain amount of undesirable distortion was associated with such welding. The distortion may limit operation of the fluid operated cylinder. This limitation resulted in added difficulty and expense in producing a suitable fluid operated bale tensioning device.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a bale tension apparatus including a support and a power member such as a fluid operated cylinder attached thereto. A piston is slidably mounted in the power member and has a piston rod slidably extending through a rod bearing member of the cylinder. Fasteners extend through the support and threadably extend into the rod bearing member.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
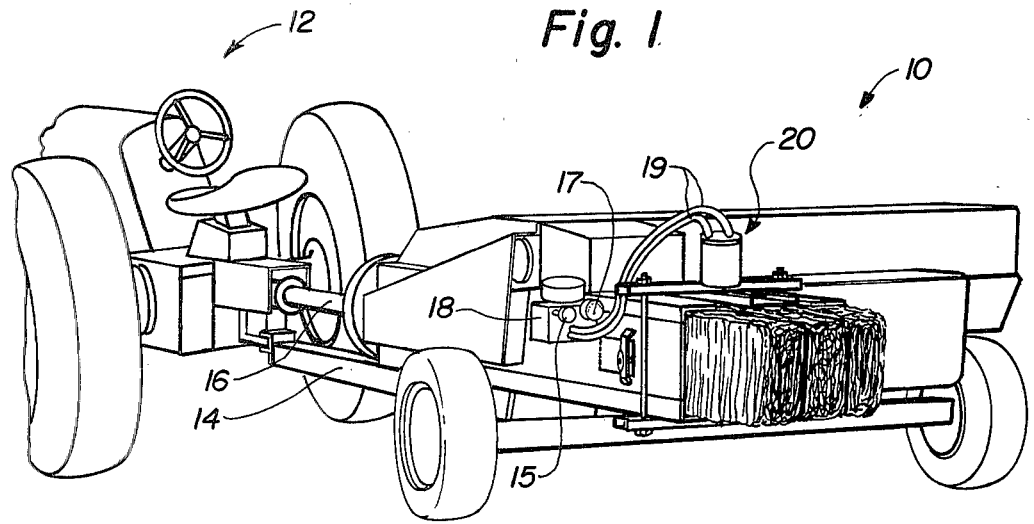
FIG. 1 is an isometric view illustrating a typical rectangular baler using an embodiment of the present invention.

In FIG. 1 a conventional rectangular baler is designated 10 and is operably connected to a towing vehicle such as a typical agricultural tractor 12 via a tow bar 14. A typical power takeoff (PTO) shaft 16 transfers power from tractor 12 to baler 10. From the PTO shaft 16, various components of baler 10 are driven such as a commercially available hydraulic pump 18 such as model VTM 42-10-NO-AJ-O7-R1-14.S-73 sold by Vickers, Inc.

Pump 18 supplies hydraulic fluid and operating pressure of from about 800 psi to about 1200 psi via hydraulic lines 19 for operating the baler tensioning apparatus of this invention generally designated 20. A relief valve knob 15 controls hydraulic pressure and consequently bale density. A gauge 17 indicates the amount of pressure being applied.

It should be understood that baler tensioning apparatus 20 is applicable to several types and models of rectangular balers, both pull-type and self-propelled.

Figure 2:
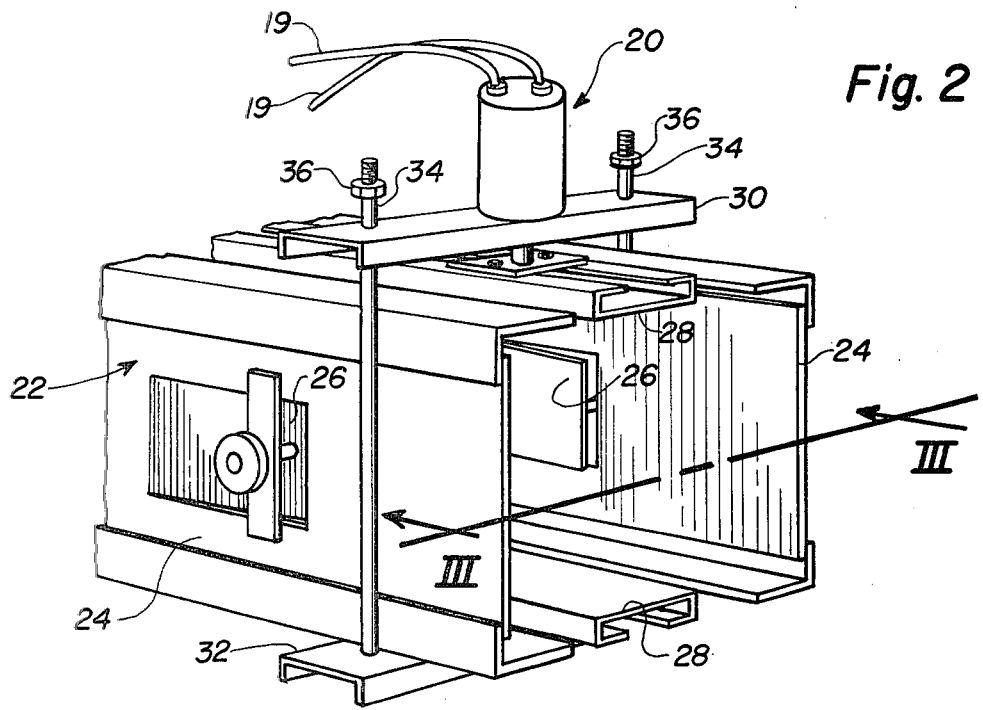
FIG. 2 is another isometric view illustrating a portion of a bale chamber using an embodiment of the present invention.

In FIG. 2, an exemplary bale chamber 22, generally of a suitable steel construction, includes opposed side panels 24 including well known adjustable flaps 26 also used as a bale tensioning device for controlling bale density. A pair of well-known tensioning rails 28 are pivotally connected to the baler 10 for adjustment either toward or away from each other for controlling bale density.

An upper support 30 is preferably a section of steel channel as is a lower support 32. A pair of steel rods 34 are each secured to lower support 32 and extend upwardly through upper support 30. A pair of nuts 36 are threadably attached to rods 34 adjacent upper support 30. In this manner, upper support 30 slidably engages and guides rods 34, and nuts 36 limits downward travel of rods 34 relative to support 30.

Figure 3:
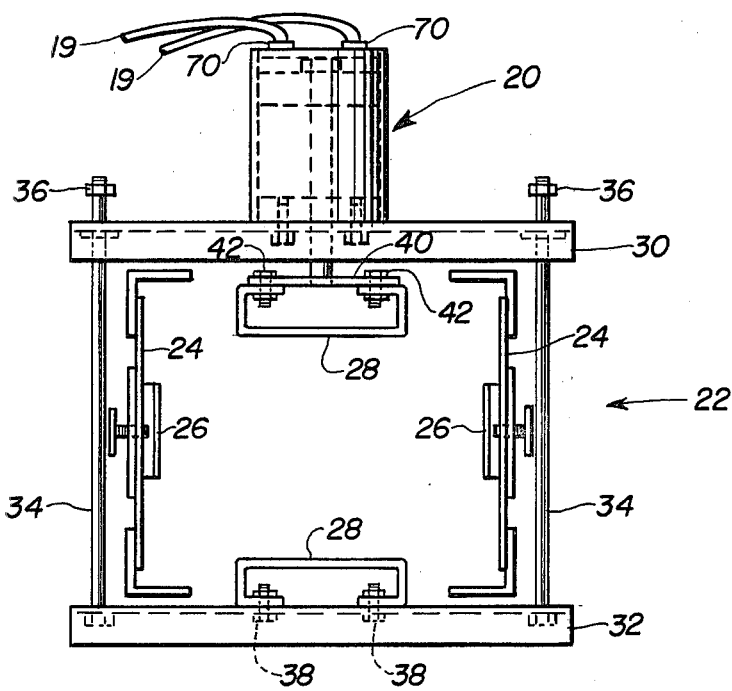
FIG. 3 is an end view illustrating the bale chamber as viewed along line 3—3 of FIG. 2.

Further in FIG. 3 it can be seen that a lower one of the tensioning rails 28 is secured to lower support 32 by bolts 38 whereas the upper one of the tensioning rail 28 is secured to a steel plate 40 by bolts 42.

Figure 4:
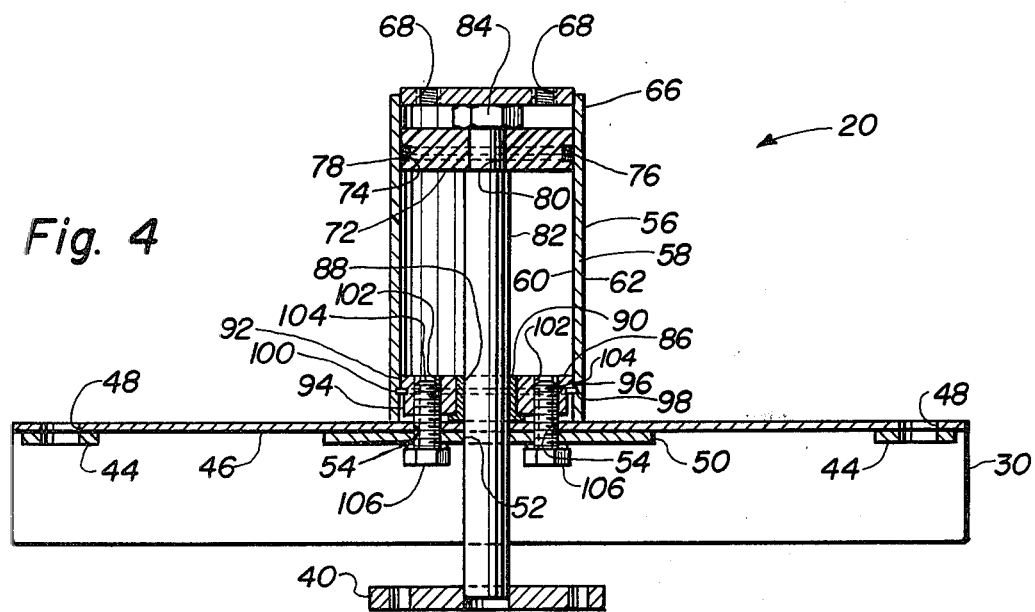
FIG. 4 is a cross-sectional side elevation illustrating an embodiment of the present invention.

In FIG. 4, baler tensioning apparatus 20 includes support 30 preferably having a pair of steel plates 44 secured, by welding or the like, to an upper plate 46 of support 30. A pair of apertures 48 are formed through plates 44 and upper plate 46 for slidably receiving and guiding rods 34. Another steel plate 50 is preferably secured, by welding or the like, to upper plate 46. A central aperture 52 and a pair of space apertures 54 are formed through plate 50 and upper plate 46.

A generally cylindrical power member 56 is fabricated from steel plate to form a tubular sidewall 58 having an inner 60, and an outer 62, peripheral surface. A top plate 64, also of steel is welded to end 66 of sidewall 58. A pair of apertures 68 are formed in plate 64 for forming a hydraulic inlet and outlet port for receiving hydraulic connectors 70 as illustrated in FIG. 3.

Figure 5:
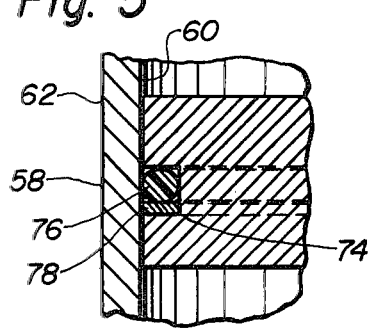
FIGS. 5 and 6 are exploded views illustrating a portion of an embodiment of the piston and rod bearing member, respectively, of this invention.

Again in FIG. 4, a sliding aluminum piston 72 includes a groove 74 wherein a typical "0" ring 76 and a back-up washer 78 are mounted in sliding, sealing engagement with inner surface 60 (see also FIG. 5). Ring 76 and washer 78 are preferably formed of a commercially available suitable synthetic material. An aperture 80 is formed through piston 72 for receiving a threaded end of a piston rod 82 which is secured by a nut 84. Another end of rod 82 is secured, preferably by welding, to steel plate 40.

Figure 6:
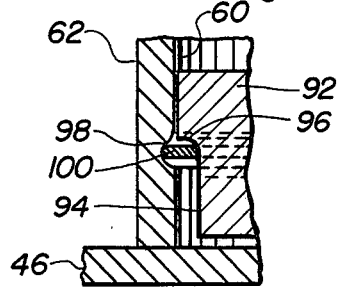

Rod 82 slidably extends through a steel cylindrical rod bearing member 86. This is accomplished by providing an aperture 88 and a wear resistant bushing 90 of a commercially available moly-impregnated glass filled synthetic material. Bearing member 86 includes an upper portion 92 of a first diameter and a lower portion 94 of a second lesser diameter. Upper and lower portions 92, 94, respectively, (see also FIG. 6) are separated by a peripheral shoulder 96 which cooperates with a peripheral groove 98 formed in surface 60 of sidewall 58 and a retaining ring 100, for limiting movement of bearing member 86 toward support 30. Bearing member 86 also includes a pair of threaded apertures 102 for receiving a pair of cap screws 104 each having a head portion 106 seated against plate 50. Thus, cap screws 104 draw head member 86 toward support 30 and, due to bearing member 86 engaging ring 100 in groove 98, power member 56 is secured to upper support 30.

With the parts assembled as set forth above, hydraulic fluid is supplied between pump 18 and power member 56. The fluid acts on piston 72 for moving rod 82 and thus moving rails 28 for adjusting tension and controlling bale density. Securing power member 56 to power support 30 by threading cap screws 104 directly into bearing member 86 avoids distortion caused by welding power member 56 to support 30 as was previously done. Also, manufacturing time and expense are significantly reduced.

The foregoing has described a bale tension apparatus having a cylinder head threadably connected directly to a support mounted immediately adjacent a bale forming chamber.

It is anticipated that aspects of the present invention, other than those specifically defined in the appended claims, can be obtained from the foregoing description and the drawings.

Having thus described the invention, what is claimed is:

1. In combination with an agricultural baler, a bale tension apparatus comprising:
    a bale chamber operably connected to said baler;
    a bale tensioning member movably connected to said bale chamber for controlling the density of a bale formed in said bale chamber;
    a support mounted on said bale chamber adjacent said bale tensioning member;
    a fluid operated cylinder connected to said support, said cylinder having a sliding piston mounted therein, a rod bearing member contained entirely within the cylinder adjacent an end thereof, and a piston rod connected at one end to said piston and at the other end of said bale tensioning member, said piston rod slidably extending through said rod bearing member;
    a plurality of fastener members extending through said support into said rod bearing member and terminating within said rod bearing member; and
    means for limiting movement of said rod bearing member toward said support.

2. The bale tensioning apparatus of claim 1, wherein said means for limiting movement of said rod bearing member toward said support comprises the rod bearing member having a peripheral shoulder formed thereon and said fluid operated cylinder including an inner peripheral groove having a retaining ring mounted therein extending into engagement with said peripheral shoulder.

3. The apparatus of claims 1 or 2 including:
    a bushing mounted in said rod bearing member slidably receiving said piston rod, said bushing having a portion thereof engaged between said rod bearing member and said support.

* * * * *